WITNESSES:
E. A. McCloskey.
R. W. Thomas

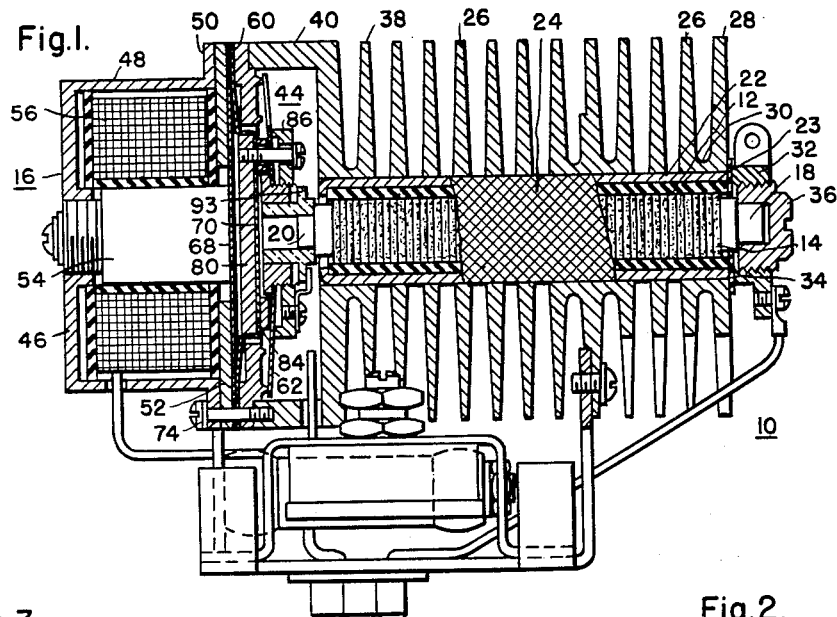
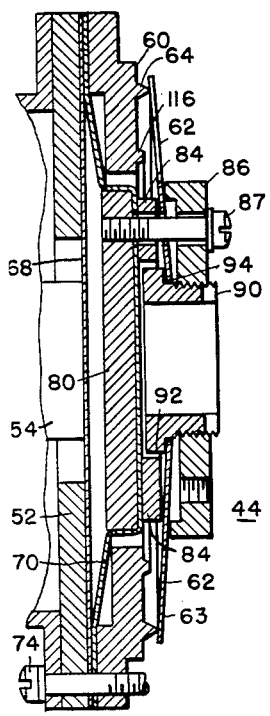
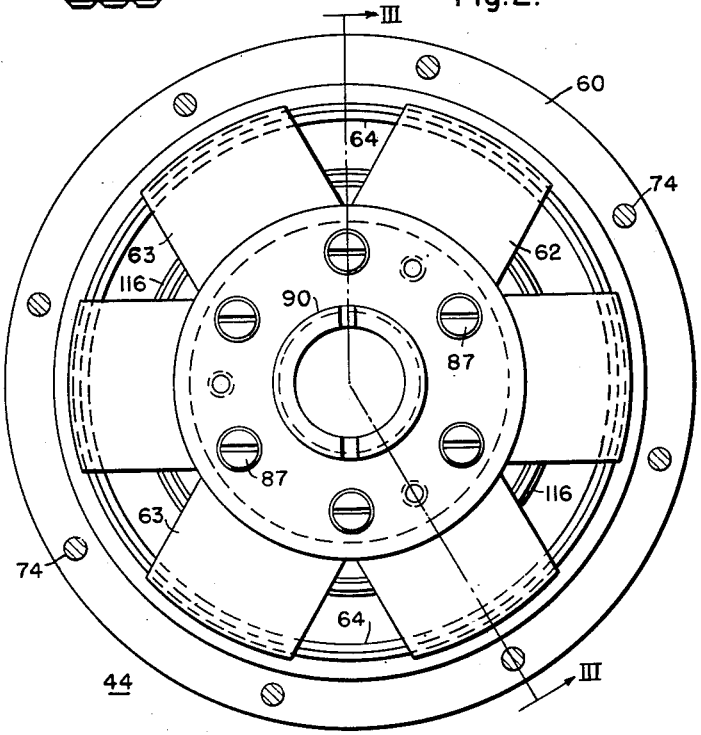
Dec. 4, 1956    L. R. LOWRY, JR., ET AL    2,773,156
ELECTRIC REGULATOR
Filed Feb. 26, 1953    2 Sheets-Sheet 1
Fig. 1.
Fig. 3.
Fig. 2.
WITNESSES:
INVENTORS
Lewis R. Lowry, Jr. and
Harrison H. C. Richards, Jr.
BY
ATTORNEY Dec. 4, 1956 L. R. LOWRY, JR., ET AL 2,773,156
ELECTRIC REGULATOR
Filed Feb. 26, 1953 2 Sheets-Sheet 2

INVENTORS
Lewis R. Lowry, Jr. and
Harrison H. C. Richards, Jr.
BY Ezra W. Savage
ATTORNEY

United States Patent Office 2,773,156
Patented Dec. 4, 1956

2,773,156

ELECTRIC REGULATOR

Lewis R. Lowry, Jr., and Harrison H. C. Richards, Jr., Lima, Ohio, assignors to Westinghouse Electric Corporation, East Pittsburgh, Pa., a corporation of Pennsylvania Application February 26, 1953, Serial No. 338,986

13 Claims. (Cl. 201—51)

This invention relates to electromagnetic regulators and more particularly to carbon pile regulators for dynamo-electric generators and electric circuits generally.

Heretofore, in the manufacture of carbon pile regulators, the opinion has been that the balancing force opposing the force produced by the electromagnet must follow basically the same law of variation as the force produced by the electromagnet. The difference between these two forces of like characteristic has been used to provide a differential regulating force. The counterbalancing force has been obtained from a spring member which is disposed so as to have a non-linear force-deflection characteristic. However, many difficulties are inherent in obtaining a non-linear force-deflection characteristic for a spring member.

One of the most common methods of obtaining a non-linear force-deflection characteristic for the spring member is to provide a wrapping action between the spring member and an abutment ring such that as the spring member is deflected, it is continuously changing its length and is thus continuously changing the slope of the spring force curve. The cantilever, volute, and nested cantilever types of spring members lend themselves to this method.

The use of a spring member with wrapping action to obtain a non-linear spring force curve has several disadvantages. First, the surfaces between the spring member and abutment ring must be very smooth and free from foreign particles (a condition difficult to maintain during the service of the carbon pile regulator) or the shape of the spring force curve will change abruptly and erratically. Second, the spring member with wrapping action requires both the spring member and the abutment ring to be manufactured to very close tolerances, thus increasing the overall cost of manufacturing the carbon pile regulator.

An alternative method of obtaining a spring member which when disposed in the carbon pile regulator has a non-linear force-deflection characteristic is by using a Belleville or a modified Belleville type spring. However, it is extremely difficult to accurately reproduce such spring members in production to thus obtain a desirable carbon pile regulator.

An object of this invention is to provide a reliable and sensitive pile regulator of a simple construction, by so pivoting a spring member on a support member that the spring member is given a linear force-deflection characteristic for effecting a counter-balancing force against the pull of an electromagnet.

Another object of this invention is to provide for preventing in a pile regulator the force exerted by the regulator's electromagnet from overcoming the force exerted by its counterbalancing spring member and thus render the regulator ineffective, by so disposing a mechanical stop member with respect to the spring member that after the spring member is actuated into engagement with the stop member the spring member operates along a new force curve.

Other objects of this invention will become apparent from the following description when taken in conjunction with the accompanying drawings, in which:

Figure 1 is an elevational view, partly in section, of a pile regulator embodying the teachings of this invention.

Fig. 2 is an enlarged plan view of the armature and spring assembly of the regulator of Fig. 1.

Fig. 3 is a sectional view of the apparatus illustrated in Fig. 2, taken along the lines III—III.

Figure 4:
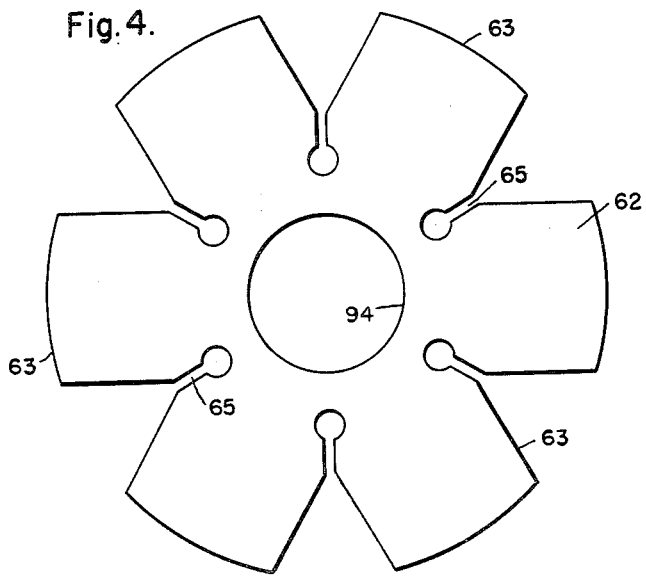
Fig. 4 is a detailed showing of the spring member incorporated in the apparatus illustrated in Fig. 1.

Referring to Fig. 1 of the drawings, this invention is illustrated by reference to a pile regulator 10 comprising a stack 12, which includes a plurality of discs 14 constructed of resistance material such as carbon, and an electromagnet 16 disposed to control the pressure applied to the stack 12.

In the embodiment illustrated in Fig. 1, the stack 12 is disposed between a relatively fixed pressure member or plate 18 and a movable pressure plate 20, the stack 12 being encased in a metallic tubular housing 22. As illustrated, a tube 23 of insulating material is disposed between the stack 12 and the housing 22. However, the discs 14 of the stack 12 are free to move within the tube 23. In this instance, the housing 22 is provided with an outer surface 24 which is roughened as by knurling or otherwise has ribs or grooves formed thereon to aid in securing a plurality of cooling fins 26 thereto. The cooling fins 26 are preferably constructed of aluminum and are disposed about the housing 22 in spaced relation lengthwise of the housing 22 for dissipating heat which is developed in the stack 12 by the current flow therethrough during the operation of the pile regulator 10.

As a general rule, the cooling fins 26 are independently mounted, one from the other, depending upon their interlocking relation with the other surface 24 of the housing 22 for maintaining them in operative position on the housing 22. However, as illustrated, a terminal fin 28 disposed at the end of the stack 12 and adjacent the fixed pressure plate 18 is joined to the adjacent fin 26 by a common hub 30 which strengthens the support of these fins on the housing 22.

In this instance, an end plate 32 is suitably mounted to the terminal fin 28, a washer 34 of insulating material being disposed between the end plate 32 and the terminal fin 28. A stack adjusting screw 36 is disposed in threaded engagement with the end plate 32 for receiving the pressure plate 18 and for making an initial adjustment of the pressure on the stack 12, which will be explained more fully hereinafter.

Referring to the opposite end of the stack 12, a terminal fin 38 is connected to a section 40 of a sectionalized housing for the electromagnet 16, in order to provide a strong support for the section 40 of the sectionalized housing. The section 40 in this instance is cup-shaped and substantially encloses an armature and spring assembly 44.

As illustrated, the electromagnet 16 is of the usual construction comprising a magnetic housing having a base plate 46, a side wall member 48 having an outwardly extending flange 50, and an end pole piece 52, and an adjustable core member 54 disposed centrally thereof. An energizing winding 56 of the electromagnet 16 is disposed within the magnetic housing and around the core member 54, the winding 56 being suitably insulated from the magnetic housing and the core member 54.

As can more clearly be seen in Figs. 2 and 3 the armature and spring assembly 44 is disposed to cooperate with a support or ring member 60. In particular, a spring member 62, having a plurality of fingers 63, is disposed to pivot or turn about a ridge 64 V-shaped in cross-section. The ridge 64 makes a substantially line contact engagement with the fingers 63 so that a linear force-deflection characteristic is given to the spring member 62. More specifically, the fingers 63 of the spring member 62 pivot or turn about the ridge 64. The spring member 62 is likewise so disposed that it exerts a counterbalancing force against the non-linear force exerted by the electromagnet 16. The difference between the force exerted by the spring member 62 and the force exerted by the electromagnet 16 constitutes the regulating force for the pile regulator 10. This will be explained in greater detail hereinafter. In addition the fingers 63 of the spring member 62 have slots 65 provided therebetween. By providing the slots 65, each of the fingers 63 acts as a free cantilever spring and eliminates any Belleville action in the central portion of the spring member 62 during the forming of the spring member.

In order to effect damping during the operation of the electromagnet 16, a disc 68, preferably of thin steel that will readily saturate and not interfere with the magnetic circuit of the electromagnet 16, and a flexible diaphragm 70 preferably of copper are disposed in cooperative relationship with one another. As can be seen from Figs. 1 and 3 of the drawings, the disc 68, the diaphragm 70, the support ring 60, and the end pole piece 52 of the electromagnet 16 are all disposed between the flange 50 of the magnetic housing and the section 40 and there held in assembled relationship by means of the screws 74.

As illustrated an armature member 80 of the electromagnet 16 is disposed in magnetic relationship with the core member 54 and with the end pole piece 52 of the electromagnet 16. In this instance, the diaphragm 70 is disposed around the outer periphery of the armature member 80 and also covers one side thereof. In order to space the spring member 62 a predetermined distance from the armature member 80 a bottom retainer ring 84 is disposed between the spring member 62 and the diaphragm 70. As will be explained hereinafter the thickness of the bottom retainer ring 84 can be varied to aid the proper adjustment of the pile regulator 10.

For the purpose of holding the spring member 62 against the bottom spring retainer 84, an upper spring retainer or holding member 86 is provided. As illustrated, the holding member 86 so engages the spring member 62 that the spring member 62 pivots between the holding member 86 and the bottom retainer ring 84. As can be seen from Fig. 3 of the drawings, the holding member 86, the spring member 62, the bottom spring retainer 84, the diaphragm 70, and the armature member 80 of the electromagnet 16 are held in assembled relationship with respect to one another by means of a plurality of spaced screws 87.

In order to pivot the spring member 62 with respect to the holding member 86, an adjustable bushing 90 having an outwardly extending flange 92 is disposed in threaded engagement with the holding member 86. As illustrated in Fig. 1, a connecting member 93, in this instance a porcelain bushing, is disposed for receiving the movable pressure plate 20 and for seating against the adjustable bushing 90. The adjustable bushing 90 extends outwardly from the armature 80 through an opening 94 in the spring member 62, the flange 92 of the bushing 90 being disposed to apply a force to the edge of the central opening 94 of the spring member 62 in opposition to the holding member 86. Thus, by rotating the adjustable bushing 90 outwardly, the flange 92 applies a force to the inner portion of the spring member 62 surrounding the central opening 94 to thereby pivot the spring member 62 with respect to the holding member 86 and thus change the loading on the spring member 62. The effect of such an adjustment can more clearly be seen by referring to Fig. 5.

Figure 5:
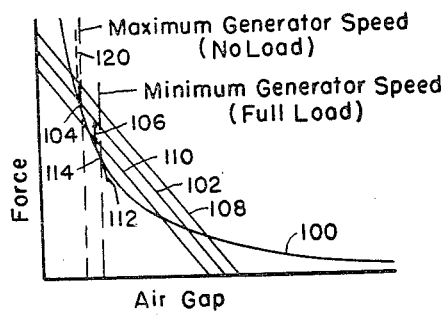
Fig. 5 is a graph, the curves of which illustrates the effect of applying a bias or load to the spring member in a predetermined manner and the effect of preventing the further movement of the spring member towards the core member of the electromagnet once it has reached a predetermined position.

Referring to Fig. 5 there is shown a plurality of curves illustrating the effect of rotating the adjustable bushing 90 of the spring and armature assembly 44. In particular, a curve 100, representing an adjusted position for the curve, illustrates the manner in which the force exerted by the electromagnet 16 varies with changes in the air gap between the armature member 80 and the core member 54 of the electromagnet 16. On the other hand, a curve 102 represents the manner in which the force exerted by the spring member 62 varies with changes in the air gap between the armature member 80 and the core member 54 of the electromagnet 16. As can be seen from Fig. 5, the curves 100 and 102 intersect at a point 104. When the curves 100 and 102 intersect at the point 104 a certain regulating force differential 106 is obtained for a given air gap between the armature member 80 and the core member 54. In order to obtain the desired regulating force differential 106 for the given air gap it is oftentimes necessary to shift either the position of the curve representing the force exerted by the electromagnet 16 or the position of the curve representing the force exerted by the spring member 62. For instance in order to shift the position of a curve 108, representing the force exerted by the spring member 62, until it assumes the position occupied by the curve 102 the adjusting bushing 90 is rotated so as to move the bushing 90 a predetermined distance towards the left to thereby decrease the loading on the spring member 62. On the other hand a curve 110, representing the force exerted by the spring member 62, can be shifted until it assumes the position occupied by the curve 102, by rotating the bushing 90 so that it moves to the right, to thereby increase the loading on the spring member 62. Thus the force at any air gap position may be increased or decreased by means of the adjustable bushing 90 to thereby obtain a proper regulating force, such as represented by the force differential 106, for a given air gap between the armature member 80 and the core member 54 of the electromagnet 16.

The air gap for the force differential 106 may be increased or decreased by changing the thickness of the bottom retainer ring 84, to thereby obtain proper clearances for operating conditions. Thus by use of the bushing 90 and by controlling the thickness of the bottom retainer ring 84, the proper regulating force differential 106 for operating conditions may be readily obtained for a given air gap.

As hereinbefore mentioned, the proper regulating force, such as the force differential 106, can be obtained by shifting the curve representing the force exerted by the electromagnet until it assumes the adjusted position occupied by the curve 100. Such a shifting of the curve representing the force exerted by the electromagnet 16 is obtained by adjusting the position of the core member 54 of the electromagnet 16 with respect to the armature member 80.

In order to obtain a proper functioning pile regulator 10 it is also necessary that the force-deflection curve of the stack 12 substantially coincide with the curve representing the force exerted by the electromagnet 16, such as the curve 100 illustrated in Fig. 5. In Fig. 5 the stack force-deflection curve is represented by a curve 112. The fact that the curve 112 does not coincide with the curve 100 at its lower portion is not important since regulation occurs between the intersecting point 104 and a point such as the point 114 on the curves 100 and 112.

In practice the adjustable bushing 90 and the core member 54 of the electromagnet 16 are adjusted to obtain the proper positioning of the curves 100 and 102 so that they intersect at the point 104, then the stack adjusting screw 36 is adjusted until the stack force-deflection curve 112 substantially coincides with the curve 100 representing the force exerted by the electromagnet 16.

In order to change the slope of the upper portion of the curve 102, representing the force exerted by the spring member 62, an inner ridge 116 of circular configuration is provided on the support ring 60, as can more clearly be seen in Fig. 3. Thus, when the armature member 80 of the armature and spring assembly 44 is actuated a predetermined distance towards the core member 54 of the electromagnet 16, the spring member 62 engages the inner ridge 116 of the support ring 60 and this engaging portion of the spring member 62 is prevented from moving further in the same direction towards the core member 54. However, the armature member 80 is still permitted to move a further predetermined distance in the direction of the core member 54. However, in doing so the slope of the upper portion of the curve 102, as illustrated in Fig. 5, is changed. This portion of the curve 102 whose slope is changed by providing the inner ridge 116 is represented by the portion 120. Thus, it can be seen by referring to Fig. 5 that the force exerted by the electromagnet 16 is never permitted to overcome the force exerted by the spring member 62, when the inner ridge 116 of the support ring 60 is provided.

Figure 6:
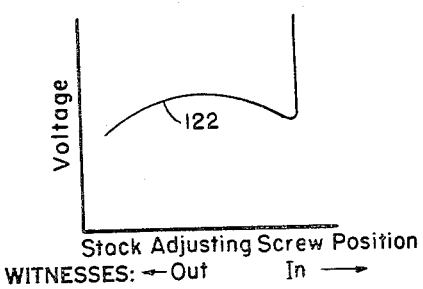
Fig. 6 is a graph, the curve of which illustrates the effect of adjusting the stack adjusting screw of the apparatus of Fig. 1, when no means are provided to substantially limit the movement of the spring member towards the core member of the electromagnet.

When the ridge 116 of the support ring 60 is not provided and the stack adjusting screw 36 is rotated until the armature member 80 engages the disc 68, the output voltage of the generator (not shown), which the pile regulator 10 is disposed to regulate, increases abruptly and the pile regulator 10 no longer functions to regulate the output voltage of the generator (not shown). This can more clearly be seen by referring to Fig. 6 of the drawings in which a curve 122 represents the manner in which the output voltage of the generator (not shown) varies with the positioning of the stack adjusting screw 36. As can be seen from the graph the curve 122 rises abruptly once the stack adjusting screw 36 has been rotated inwardly such a distance that the armature member 80 engages the disc 68.

Figure 7:
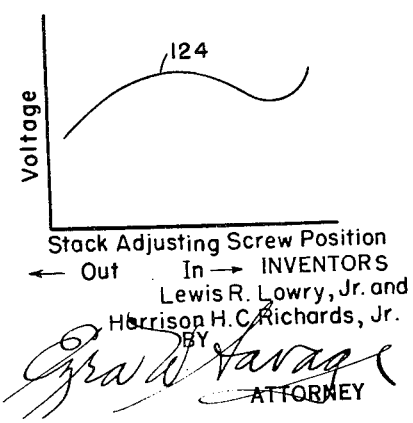
Fig. 7 is a graph, the curve of which illustrates the effect of adjusting the stack adjusting screw of the apparatus of Fig. 1 when means are provided for substantially limiting the movement of the spring member towards the core member of the electromagnet.

On the other hand, when the ridge 116 of the support ring 60 is provided, the output voltage of the generator (not shown) varies with changes in the position of the stack adjusting screw 36 as represented by a curve 124, shown in Fig. 7. Thus, by providing the ridge 116 and thus limiting the movement of the armature 80 towards the core member 54 of the electromagnet 16, the output voltage of the generator (not shown) does not rise abruptly as is the case when the ridge 116 is not provided and the pile regulator with the ridge 116 continues to function to regulate the output voltage of the generator (not shown).

The pile regulator 10 embodying the teachings of this invention has several advantages. For instance, the spring member 62 and the support ring 60 need not be manufactured to close tolerances in order to obtain an accurate and reliable carbon pile regulator. In addition, when utilizing the pile regulator 10, embodying the teachings of this invention, the lodging of dirt particles between the spring member 62 and the support ring 60 does not affect the operation of the regulator 10.

A further advantage of the apparatus embodying the teachings of this invention is that the spring member 62 is flat when unrestrained and thus can be readily manufactured by a simple punching operation.

Since certain changes may be made in the above apparatus, and different embodiments of the invention could be made without departing from the scope thereof, it is intended that all matter contained in the above description or shown in the accompanying drawings shall be interpreted as illustrative and not in a limiting sense.

We claim as our invention:

1. In a pile regulator having a stack of resistance material and an electromagnet disposed for operation to control the pressure applied to the stack, the combination comprising, a core member for the electro-magnet, a support member carried by the electromagnet, the support member having a ridge disposed thereon, an armature member for the electromagnet disposed in magnetic relationship with the core member, a spring member disposed to have a linear force-deflection characteristic and disposed to be carried by the armature member, the spring member extending outwardly beyond the periphery of the armature member to seat on the ridge of the support member and make substantially line contact engagement therewith so that on movement of the armature member the spring member pivots about the ridge, and a holding member carried by the armature member disposed in seating engagement with the spring member intermediate opposite ends thereof to maintain the spring member positioned between the armature member and the holding member.

2. In a pile regulator having a stack of resistance material and an electromagnet disposed for operation to control the pressure applied to the stack, the combination comprising, a core member for the electromagnet, a support ring carried by the electromagnet, the support ring having disposed thereon a ridge of circular configuration, an armature member for the electromagnet disposed in magnetic relationship with the core member, a spring member disposed to have a linear force-deflection characteristic and disposed to be carried by the armature member, the spring member extending outwardly beyond the periphery of the armature member to seat on the ridge of the support ring and make substantially line contact engagement therewith, and a holding member disposed in seating engagement with the spring member intermediate opposite ends thereof to maintain the spring member positioned between the armature member and the holding member.

3. In a pile regulator having a stack of resistance material and an electromagnet disposed for operation to control the pressure applied to the stack, the combination comprising, a core member for the electromagnet, a support member having disposed thereon an inner and an outer ridge both of circular configuration, an armature member for the electromagnet disposed in magnetic relationship with the core member, a spring member disposed to have a linear force curve and disposed to be carried by the armature member, the spring member extending outwardly beyond the periphery of the armature member to seat on the outer ridge of the support member and make substantially line contact engagement therewith, the inner ridge of the support member preventing the air gap between the armature member and the core member from being decreased to substantially zero, and a holding member disposed in seating engagement with the spring member intermediate opposite ends thereof to maintain the spring member positioned between the armature member and the holding member.

4. In a pile regulator having a stack of resistance material and an electromagnet disposed for operation to control the pressure applied to the stack, the combination comprising, a core member for the electromagnet, a support member carried by the electromagnet, the support member having a ridge disposed thereon, an armature member for the electromagnet disposed in magnetic relationship with the core member, a spring member disposed to have a linear force-deflection characteristic and disposed to be carried by the armature member, the spring having a central opening therein and a plurality of spaced fingers extending outwardly beyond the periphery of the armature member to seat on the ridge of the support member and make substantially line contact engagement therewith, so that on movement of the armature member the fingers of the spring member pivot about the ridge, a holding member carried by the armature member disposed in seating engagement with the spring member intermediate opposite ends thereof to maintain the spring member positioned between the armature member and the holding member, and a flanged bushing disposed in threaded engagement with the holding member with the flange thereof disposed between the armature member and the edge of the central opening of the spring member, the flanged bushing being disposed to be adjusted relative to the holding member to apply force to the spring member in opposition to the holding member to control the loading of the spring member as it seats against the ridge of the support member.

5. In a pile regulator having a stack of resistance material and an electromagnet disposed for operation to control the pressure applied to the stack, the combination comprising, a core member for the electromagnet, a support member having disposed thereon an inner and an outer ridge both of circular configuration, an armature member for the electromagnet disposed in magnetic relationship with the core member, a spring member disposed to have a linear force curve and disposed to be carried by the armature member, the spring member having a central opening therein and a plurality of spaced fingers extending outwardly beyond the periphery of the armature member to seat on the outer ridge of the support member and make substantially line contact engagement therewith, the inner ridge of the support member preventing the air gap between the armature member and the core member from being descreased to substantially zero, a holding member carried by the armature member disposed in seating engagement with the spring member intermediate the central opening of the spring member and the end of its spaced fingers to maintain the spring member positioned between the armature member and the holding member, and a flanged bushing disposed in threaded engagement with the holding member with the flange thereof disposed between the armature member and the edge of the central opening of the spring member, the flanged bushing being disposed to be adjusted relative to the holding member to apply a force to the spring member in opposition to the holding member to control the loading of the spring member as its fingers seat on the outer ridge of the support member.

6. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements to be successively engaged as successive fulcrums by said spring step-by-step during continued progressive magnet pull deflection of said spring.

7. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements of different axial lengths to be successively engaged as successive fulcrums by said spring step-by-step during continued progressive magnet pull deflection of said spring.

8. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements to be successively engaged as successive fulcrums by said spring step-by-step during continued progressive magnet pull deflection of said spring to produce a deflection force curve consisting in a plurality of successive linear portions of different spring rates, or stiffness.

9. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having a plurality of radially spaced fulcrum elements of different axial lengths to be successively engaged as successive fulcrums by said spring step-by-step during continued progressive magnet pull deflection of said spring to produce a deflection force curve consisting in a plurality of successive linear portions of different spring rates, or stiffness.

10. In an electric regulator including a variable resistance carbon pile disc assembly, an electromagnet assembly including an armature, a spring carried by said armature to resist magnet pull and apply axial pressure on said carbon pile, a fulcrum member against which said spring rests, said member having two radially spaced fulcrum elements of different axial lengths to be successively engaged as successive fulcrums by said spring step-by-step during continued progressive magnet pull deflection of said spring.

11. In an electrical regulator including a housing and a variable resistance carbon pile disc assembly, an electromagnet assembly having an armature and operatively connected to said carbon pile disc assembly, a single spring having a plurality of radially extending fingers and carried by said armature, a stationary ring carried by said housing and having an outer rim and a radially spaced inner rim, both of said rims extending axially toward said spring, the outer rim being axially longer than said inner rim, the spring being assembled to initially engage the outer rim and under deflection of magnet pull, resisted by the spring, to initially use the outer rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of different spring rates, or stiffness.

12. In an electrical regulator including a housing and a variable resistance carbon pile disc assembly, an electromagnet assembly having an armature and operatively connected to said carbon pile disc assembly, a single spring carried by said armature, a stationary ring carried by said housing and having radially spaced inner and outer rims extending axially toward said spring, the outer rim being axially longer than said inner rim, the spring being assembled to initially engage the outer rim and under deflection of magnet pull, resisted by the spring, to initially use the outer rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of spring rates, or stiffness.

13. In an electrical regulator including a housing and a variable resistance carbon pile disc assembly, an electromagnet assembly having an armature and operatively connected to said carbon pile disc assembly, a spring carried by said armature, a stationary ring carried by said housing and having radially spaced rims extending axially toward said spring, the spring being assembled to initially engage the relatively radially outwardly disposed rim and under deflection of magnet pull, resisted by the spring, to initially use the relatively radially outwardly disposed rim as an outer fulcrum to produce a linear portion of a force deflection curve and, after a predetermined continued deflection, under magnet pull, to engage said inner rim as an inner fulcrum to produce a second linear portion of a deflection force curve consisting in successive linear portions of spring rates, or stiffness.

References Cited in the file of this patent

UNITED STATES PATENTS 2,268,718    Newton _____ Jan. 6, 1942